United States Patent
Chien et al.

(10) Patent No.: US 9,690,407 B2
(45) Date of Patent: Jun. 27, 2017

(54) ELECTRONIC DEVICE COVER PLATE FOR DRAINING ELECTROSTATIC CHARGES USING CONDUCTIVE LAYER CONNECTION TO GROUND AND ELECTRONIC DEVICE HAVING THE SAME

(71) Applicant: HTC Corporation, Taoyuan County (TW)

(72) Inventors: Shih-Po Chien, Taoyuan County (TW); Yi-Ting Liu, Taoyuan County (TW); Yu-Jing Liao, Taoyuan County (TW); I-Cheng Chuang, Taoyuan County (TW); Chia-Huan Chang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 109 days.

(21) Appl. No.: 14/462,564

(22) Filed: Aug. 19, 2014

(65) Prior Publication Data

US 2016/0057899 A1 Feb. 25, 2016

(51) Int. Cl.
*G06F 3/041* (2006.01)
*H04M 1/02* (2006.01)
*H04M 1/18* (2006.01)
*H04B 1/3888* (2015.01)

(52) U.S. Cl.
CPC ......... *G06F 3/0412* (2013.01); *H04B 1/3888* (2013.01); *H04M 1/0266* (2013.01); *H04M 1/185* (2013.01)

(58) Field of Classification Search
CPC .. H05K 9/0067; H05K 1/0259; H05K 9/0079; G06F 3/044; G06F 2203/04107; G06F 3/041; G06F 3/0412; H01R 13/6485
See application file for complete search history.

(56) References Cited

U.S. PATENT DOCUMENTS

| | | | | |
|---|---|---|---|---|
| 6,728,555 B1 * | 4/2004 | Pirila | .................. | H04M 1/0202 361/816 |
| 7,911,759 B2 * | 3/2011 | Williams | ............. | H04M 1/0202 361/212 |
| 2003/0025244 A1 * | 2/2003 | Bhatt | ................ | H01L 21/67383 264/254 |
| 2003/0171827 A1 * | 9/2003 | Keyes, IV | ......... | G05B 19/4183 700/19 |
| 2006/0110949 A1 * | 5/2006 | Jee | ...................... | H01R 13/2442 439/64 |
| 2008/0024462 A1 * | 1/2008 | Kim | ...................... | G06F 1/1626 345/174 |

(Continued)

FOREIGN PATENT DOCUMENTS

| | | |
|---|---|---|
| CN | 201867776 | 6/2011 |
| TW | M472250 | 2/2014 |

*Primary Examiner* — Devan Sandiford
(74) *Attorney, Agent, or Firm* — Jianq Chyun IP Office

(57) ABSTRACT

A cover plate used for an electronic device is provided. The cover plate includes a plate and a conductive layer. The plate has two surfaces opposite to each other and a lateral surface connected between the two surfaces. The lateral surface of the plate is framed by the conductive layer which is electrically connected to a ground end of the electronic device. The disclosure further provides an electronic device including the cover plate and a main body. The main body is disposed within the electronic device and electrically connected to the conductive layer.

18 Claims, 5 Drawing Sheets

(56) References Cited

U.S. PATENT DOCUMENTS

| | | | | |
|---|---|---|---|---|
| 2009/0128982 A1* | 5/2009 | Oshima | H05K 9/0067 | 361/212 |
| 2010/0033886 A1* | 2/2010 | Williams | H04M 1/0202 | 361/56 |
| 2010/0201640 A1* | 8/2010 | Nozawa | G06F 3/045 | 345/173 |
| 2011/0063814 A1* | 3/2011 | Nimura | H05K 9/0067 | 361/796 |
| 2011/0074705 A1* | 3/2011 | Yousefpor | G06F 3/041 | 345/173 |
| 2011/0164365 A1* | 7/2011 | McClure | G06F 1/1613 | 361/679.3 |
| 2011/0164370 A1* | 7/2011 | McClure | G06F 1/1613 | 361/679.26 |
| 2011/0164372 A1* | 7/2011 | McClure | G06F 1/1613 | 361/679.26 |
| 2012/0127686 A1* | 5/2012 | Hsu | H05F 3/04 | 361/807 |
| 2012/0194393 A1* | 8/2012 | Uttermann | H01Q 1/243 | 343/702 |
| 2012/0194998 A1* | 8/2012 | McClure | G06F 1/1626 | 361/679.56 |
| 2013/0127480 A1 | 5/2013 | Cuseo et al. | | |
| 2013/0329460 A1* | 12/2013 | Mathew | H05K 5/02 | 362/612 |
| 2014/0035860 A1* | 2/2014 | Wong | G06F 3/044 | 345/174 |
| 2014/0111927 A1* | 4/2014 | Raff | G06F 1/1637 | 361/679.21 |
| 2014/0160059 A1* | 6/2014 | Chung | G06F 3/044 | 345/174 |
| 2014/0204290 A1* | 7/2014 | Chen | G06F 3/044 | 349/12 |
| 2014/0285468 A1* | 9/2014 | Liao | G06F 3/044 | 345/174 |
| 2015/0070622 A1* | 3/2015 | Christophy | G06F 1/182 | 349/58 |
| 2015/0216024 A1* | 7/2015 | Kwong | H05K 9/0067 | 361/220 |
| 2015/0234520 A1* | 8/2015 | Chen | G06F 3/044 | 345/173 |
| 2016/0014529 A1* | 1/2016 | Hecht | G06F 1/16 | 381/388 |
| 2016/0077628 A1* | 3/2016 | Liu | G06F 3/044 | 345/174 |
| 2016/0373864 A1* | 12/2016 | Hecht | H04M 1/0266 | |

* cited by examiner

ELECTRONIC DEVICE COVER PLATE FOR DRAINING ELECTROSTATIC CHARGES USING CONDUCTIVE LAYER CONNECTION TO GROUND AND ELECTRONIC DEVICE HAVING THE SAME

BACKGROUND OF THE DISCLOSURE

Field of the Disclosure

The disclosure is related to a cover plate and an electronic device, and more particularly to a cover plate which may drain electrostatic charges and an electronic device with slim borders.

Description of Related Art

Currently, a variety of touch control products such as smart phones or tablet PCs are available on the market. When users operate these types of touch control products, since human body carries a certain degree of electrostatic charges, the electrostatic charges carried by the human body will be transmitted from fingers to the touch panel, causing electro-static discharge (ESD) phenomenon. The electro-static current generated by the ESD may be transmitted to a transmitting circuit of the touch panel, causing damage to the transmitting circuit.

One of the methods that prevent the touch panel from being damaged by the ESD is to dispose a ground line next to the transmitting circuit. Specifically, FIG. 1 is a schematic view illustrating a conventional electronic device. Please refer to FIG. 1. A conventional electronic device 10 has a touch panel 12. In FIG. 1, a portion of a decoration layer 14 is hidden while a portion of a peripheral circuit 16 of a touch panel 12 is exposed. As shown by FIG. 1, the peripheral circuit 16 of the touch panel 12 includes a plurality of transmitting circuits 18 and a circular ground line 19 which is located outside the transmitting circuit 18 with a certain width. The circular ground line 19 is used for draining electrostatic charges to prevent the electronic device 10 from being damaged by the ESD. However, such decoration layer 14 at the peripheral circuit 16 of the touch panel 12 needs to have a certain width to cover the peripheral circuit 16, making it difficult to achieve slim border design.

SUMMARY OF THE DISCLOSURE

The disclosure provides a cover plate which may drain electrostatic charges.

The disclosure provides an electronic device with a slim border which may prevent occurrence of ESD phenomenon.

The disclosure provides a cover plate for an electronic device. The cover plate includes a plate and a conductive layer. The plate has two surfaces opposite to each other and a lateral surface connected between the two surfaces. The lateral surface of the plate is framed by the conductive layer which is electrically connected to a ground end of the electronic device.

In the disclosure, an electronic device includes a cover plate and a main body. The cover plate includes a plate and a conductive layer, wherein the plate has two surfaces opposite to each other and a lateral surface connected between the two surfaces. The lateral surface of the plate is framed by the conductive layer which is electrically connected to a ground end of the electronic device. The main body is disposed within the electronic device and electrically connected to the conductive layer.

Based on the above descriptions, the cover plate of the disclosure conducts the main body of the electronic device by disposing the conductive layer to frame the lateral surface of the plate. When the user operates the electronic device, the electrostatic charges from fingers may flow to the main body along the conductive layer of the cover plate, thereby preventing the occurrence of ESD. In addition, the disclosure replaces the circular ground line of the conventional touch panel with the conductive layer framing the lateral surface of the plate; in that case, the width of the decoration layer of the touch panel will be sufficient as long as it can cover the transmission circuit. Therefore, the slim border design for the electronic device may be realized.

In order to make the aforementioned features and advantages of the disclosure more comprehensible, embodiments accompanying figures are described in detail below.

DESCRIPTION OF EMBODIMENTS

Figure 1:
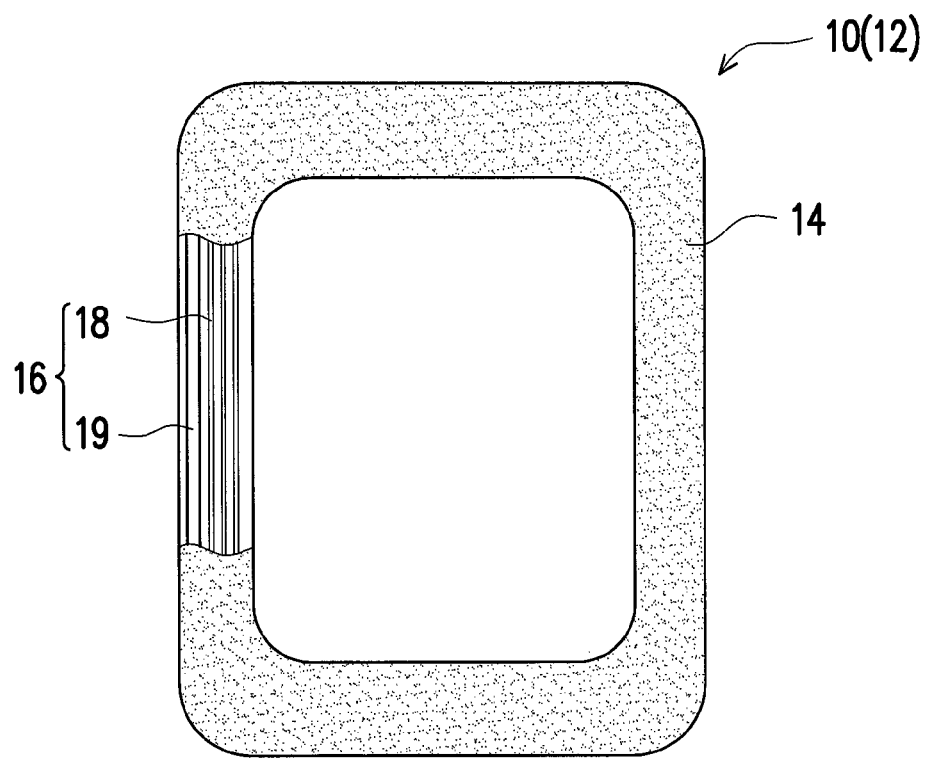
FIG. 1 is a schematic view illustrating a conventional electronic device.
Figure 2A:
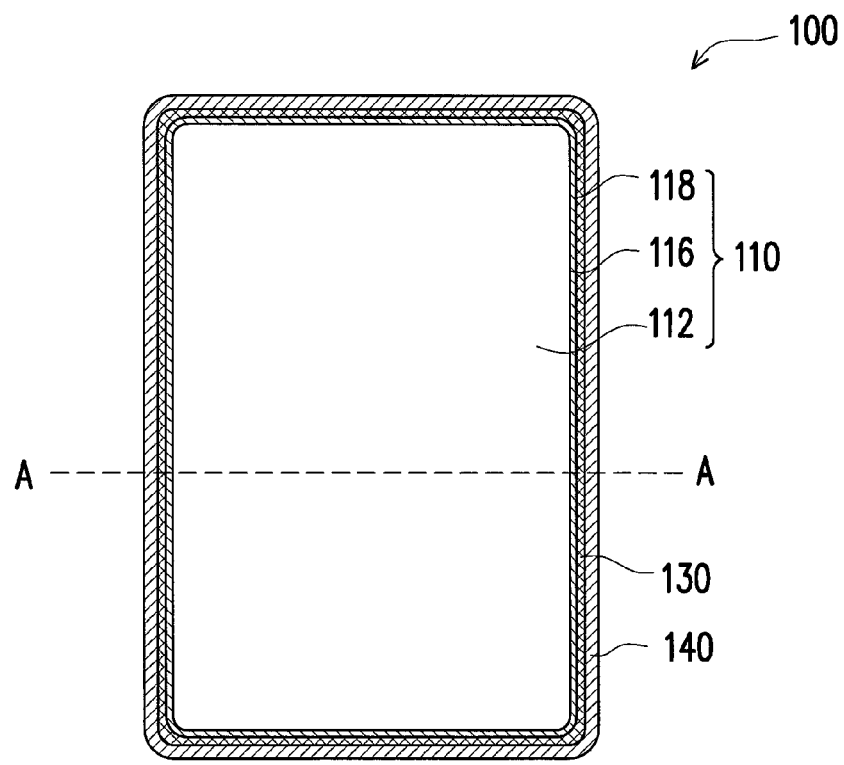
FIG. 2A is a schematic view illustrating an electronic device according to an embodiment of the disclosure.
Figure 2B:
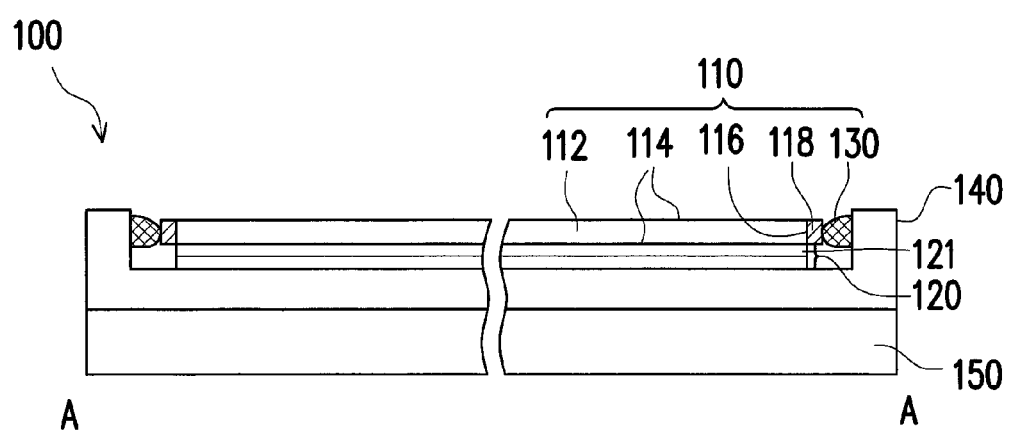
FIG. 2B is a cross-sectional schematic view along line A-A of the electronic device according to FIG. 2A.

FIG. 2A is a schematic view illustrating an electronic device according to an embodiment of the disclosure. FIG. 2B is a cross-sectional schematic view along line A-A of the electronic device according to FIG. 2A. Please refer to FIGS. 2A and 2B. In the embodiment, an electronic device 100 includes a cover plate 110, a touch display module 120, a conductive article 130, a frame 140 and a main body 150. The cover plate 110 is disposed on the touch display module 120. In the embodiment, the cover plate 110 is a glass protection cover or a transparent protection cover; however, the disclosure provides no limitation to the type of the cover plate 110. The touch display module 120 is embedded with a touch layer 121. The main body 150 is disposed at one side of the touch display module 120 and includes a circuit board, a processing unit, a storage medium, a power module and so on. The frame 140 encompasses the cover plate 110 and the touch display module 120. Specifically, the touch layer 121 is an embedded touch panel, and the touch module is embedded within the display module; the embedding may be categorized into in-cell type and on-cell type.

Figure 3:
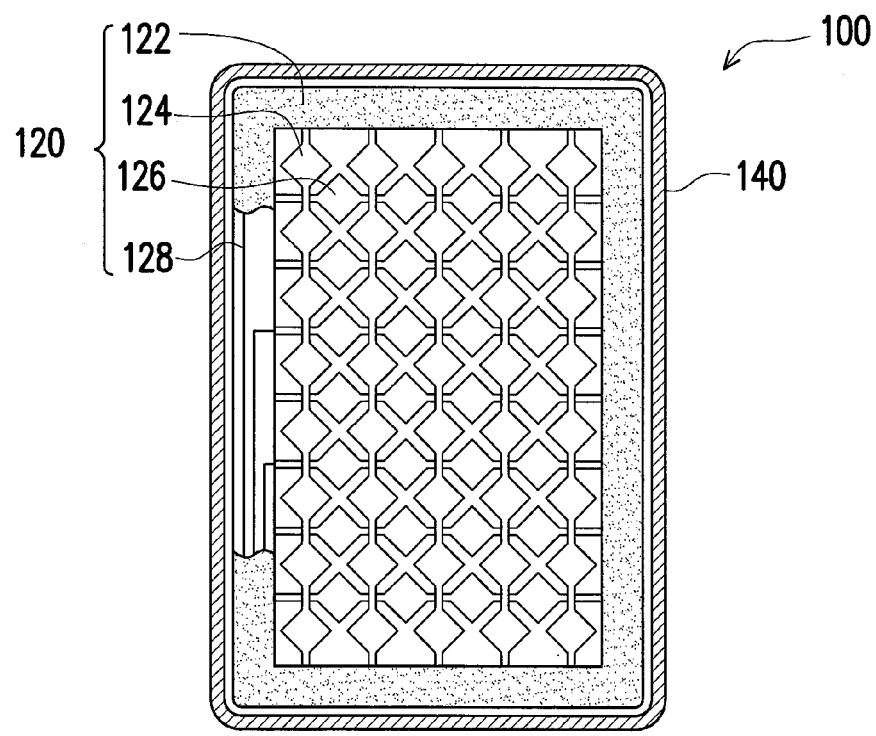
FIG. 3 is a schematic view illustrating the electronic device according to FIG. 2A with a hidden cover plate and a hidden conductive article.

Please note that, since the cover plate 110 of the embodiment is a transparent cover plate, as a matter of fact, if looking from the front side of the electronic device 100 (i.e. from the viewing angle of FIG. 2A), the user will directly see through the cover plate 110 and the touch display module 120 will be in sight. However, FIG. 2A is provided mainly to show the relation among the cover plate 110, the conductive article 130 and the frame 140, and therefore the touch display module 120 is deliberately hidden from the viewing angle of FIG. 2A to keep the drawing from being messy with too many lines. In the following paragraphs, FIG. 3 is provided to further describe the touch display module 120.

As shown by FIGS. 2A and 2B, the cover plate 110 includes a plate 112 and a conductive layer 118. The plate 112 has two surfaces 114 opposite to each other and a lateral surface 116 connected between two surfaces 114; meanwhile, the lateral surface 116 of the plate 112 is framed by the conductive layer 118. In the embodiment, the material of the frame 140 is metal, and the conductive layer 118 is conducted to the frame 140 via the conductive article 130. In the embodiment, the conductive layer 118 is formed of a cured conductive adhesive. In actual assembling, it may be that the touch display module 120 and the cover plate 110 are put into the frame 140 first, and then the conductive adhesive are dripped into the gap between the conductive layer 118 and the frame 140. The cured conductive adhesive not only enables the conductive layer 118 to be conducted to the frame 140, but also secures the cover plate 110 and the frame 140. However, in other embodiments, the conductive layer 118 may be formed at the lateral surface 116 of the plate 112 via other means such as coating, spraying, plating or injection molding. Certainly, the disclosure provides no limitation to the forming method of the conductive layer 118.

In other embodiments, the conductive layer 118 may not encompass the plate 112. For example, in the cases where an edge of the display module is closely adjacent to the conductive article 130, or certain specific parts of the plate 112 are less likely to be damaged by electrostatic charges, the conductive layer 118 may not be disposed nearby those parts of the plate 112.

In addition, in the embodiment, the conductive article 130 includes a conductive rubber; however, the disclosure provides no limitation to the type of the conductive article 130. In the embodiment, the cover plate 110 of the electronic device 100 enables the conductive layer 118 to be conducted to the frame 140 by framing the lateral surface 116 of the plate 112 with the conductive layer 118. Since it is easy for the electrostatic charges to flow toward the gap between the cover plate 110 and the frame 140, when the user operates the electronic device 100, the electrostatic charges from fingers may flow toward the frame 140 along the conductive layer 118 of the cover plate 110. The frame 140 is grounded to the main body 150 (e.g. a circuit board within the main body 150) of the electronic device 100, and the circuit board is used as a ground end of the electronic device 100; the electrostatic charges will be drained via the path to keep the electronic device 100 from being damaged by the electrostatic discharge, ESD. Moreover, in the electronic device 100 of the embodiment, the circular ground line 19 on the conventional touch panel 12 is replaced by the conductive layer 118 which frames the lateral surface 116 of the plate 112 and the frame 140 which is conducted to the conductive layer 118. In other words, the touch display module 120 of the embodiment does not need a circular ground line to be disposed outside the transmission circuit 128. In that case, the width of the decoration layer 122 on the touch display module 120 for covering the transmission circuit 128 may be reduced. Therefore, the slim border design of the electronic device 100 may be realized. Certainly, in other embodiments, the conductive article 130 may be directly and electrically connected to the circuit board of the electronic device 100 without being connected to the frame 140 in advance.

Furthermore, in other embodiments, the conductive article 130 may simply provide the function of conducting the conductive layer 118 of the cover plate 110 to the frame 140. The conductive article 130 may be formed of, for example, metal or other conductive materials; the disclosure provides no limitation to the type of the conductive article 130. Alternatively, an additional thickness may be added to a portion of the conductive layer 118 so the thicker portion of the conductive layer 118 directly contacts the frame 140 without being conducted via the conductive article 130.

FIG. 3 is a schematic view illustrating the electronic device according to FIG. 2A with a hidden cover plate and a hidden conductive article. Please refer to FIG. 3 further. In order to show the element of the touch display module 120 clearly, the cover plate 110 above the touch display module 120 is deliberately hidden from FIG. 3. Meanwhile, a portion of the decoration layer 122 of the touch display module 120 is also hidden from FIG. 3 while a portion of the external transmission circuit 128 is exposed.

In the embodiment, the touch display module 120 includes a plurality of first conductive articles 124 and a plurality of second conductive articles 126 located at the center and a plurality of transmission circuits 128 located externally. The first conductive articles 124 and the second conductive articles 126 are vertically disposed and insulated from each other. The first conductive articles 124 are connected to a portion of the transmission circuit 128, and the second conductive articles 126 are connected to the other portion of the transmission circuit 128. In the embodiment, the conductive object (e.g. fingers) may touch an external surface of the cover plate 110 to perform touch control operation to the touch display module 120, and the electrostatic charges from the fingers may be transmitted to the frame 140 from the conductive layer 118 outside the cover plate 110 via the conductive article 130, preventing the electronic device 100 from being damaged by the ESD.

Apart from that, in other embodiments, the disclosure provides no limitation to the position where the conductive article 130 is located in the gap between the conductive layer 118 and the frame 140. Besides, since it may be that the frame 140 is partially formed of metal, for example, the frame 140 is formed of metal and plastic by injection molding, the position of the conductive article 130 may be changed according to the configuration of the material of the frame 140, enabling the conductive layer 118 of the cover plate 110 to be connected to the region of the frame 140 which is formed of metal material.

Figure 4:
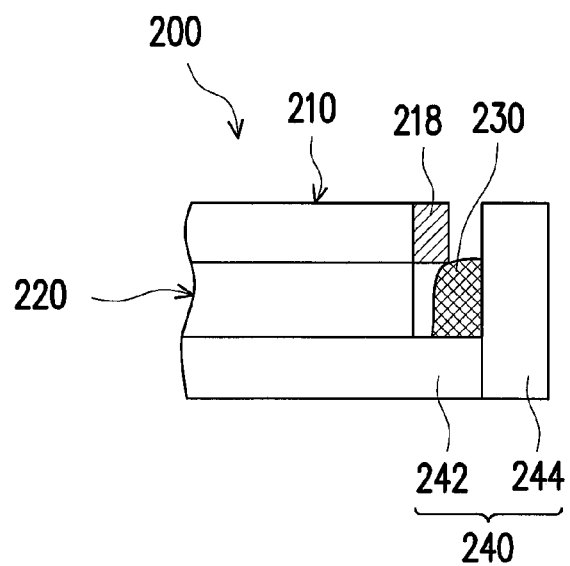
FIG. 4 is a cross-sectional schematic view illustrating a local part of an electronic device according to another embodiment of the disclosure.

Specifically, FIG. 4 is a cross-sectional schematic view illustrating a local part of an electronic device according to another embodiment of the disclosure. Please refer to FIG. 4, in the embodiment, a frame 240 includes a first portion 242 and a second portion 244, wherein the material of the first portion 242 is metal, and the material of the second portion 244 is plastic. In the embodiment, although the conductive article 230 contacts the first portion 242 and the second portion 244 of the frame 240, the conductive layer 218 is conducted to the first portion 242 of the frame 240 only. When an electronic device 200 is assembled, the conductive adhesive may be dripped at a specific position of the frame 240 corresponding to the conductive layer 218 first, and the touch display module 220 and the cover plate 210 are put in later. Certainly, the disclosure provides no limitation to the assembling sequence of the electronic device 200.

Figure 5:
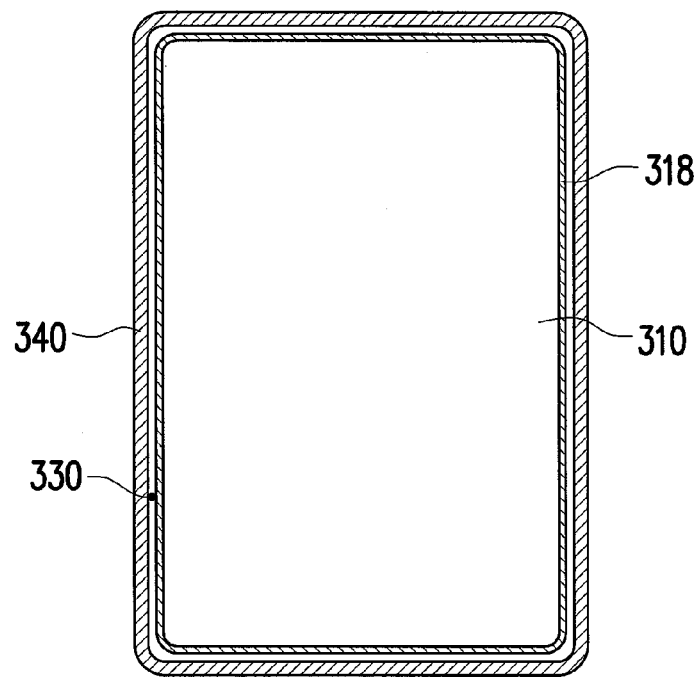
FIG. 5 is a schematic view illustrating an electronic device according to another embodiment of the disclosure.

In addition, please note that, in the abovementioned embodiments, although the conductive articles 130 and 230 are disposed in a circular manner within the gap between the cover plates 110, 210 and the frames 140, 240, it will be sufficient as long as the conductive articles 130 and 230 enable the conductive layers 118, 218 to be conducted to the frames 140, 240. The conductive articles 130 and 230 are not necessarily to be disposed in a circular manner, which should not be construed as a limitation to the disclosure. FIG. 5 is a schematic view illustrating an electronic device according to another embodiment of the disclosure. Please refer to FIG. 5. In the embodiment, a conductive article 330 is simply disposed within a small block in the gap between a cover plate 310 and a frame 340 in the drawing; however, a conductive layer 318 of the cover plate 310 may still be conducted to the frame 340 via the conductive article 330 to achieve the effect of draining the electrostatic charges.

The abovementioned embodiments are shown to exemplify only one of the electronic devices provided with a touch control function. Another types of electronic devices with the touch control function that are provided below also achieve the effect of draining the electrostatic charges via the cover plate and the frame through an identical or a similar manner.

Figure 6:
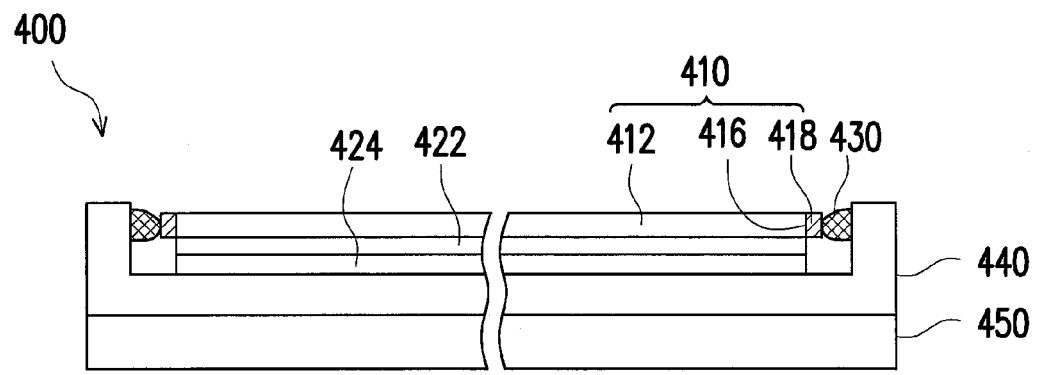
FIG. 6 is a cross-sectional schematic view illustrating an electronic device according to another embodiment of the disclosure.

FIG. 6 is a cross-sectional schematic view illustrating an electronic device according to another embodiment of the disclosure. Please refer to FIG. 6. In the embodiment, an electronic device 400 includes a cover plate 410, a touch module 422, a display module 424, a conductive article 430, a frame 440, and a main body 450. The touch module 422 is disposed between the cover plate 410 and the display module 424, and the frame 440 encompasses the cover plate 410, the touch module 422 and the display module 424. The main body 450 is disposed at one side of the display module 424. In the embodiment, although the element that is used for performing the touch control function is different from that mentioned in the above embodiments, the electronic device 400 may still enable a conductive layer 418 which frames a lateral surface 416 of a plate 412 to contact a conductive article 430, and the conductive article 430 contacts the frame 440, enabling the conductive layer 418 to be conducted to the frame 440. In the case, when the user operates the electronic device 400, the electrostatic charges from the fingers may flow toward the frame 440 along the conductive layer 418 of the cover plate 410 and be conducted to the ground end on a main body 450, thereby preventing the ESD from damaging the electronic device 400.

Figure 7:
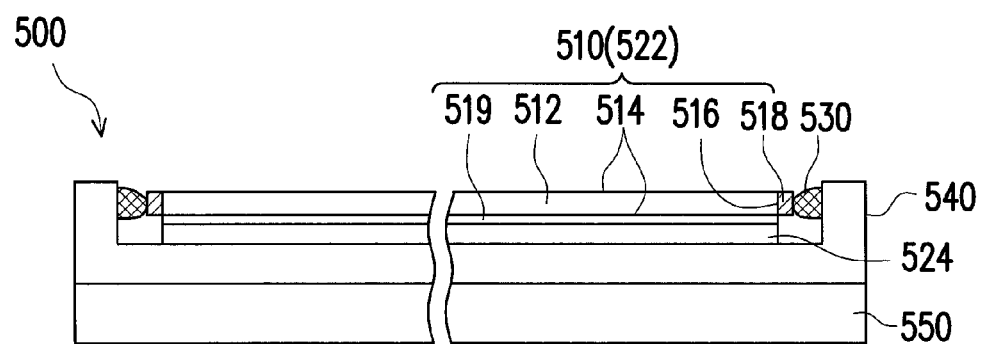
FIG. 7 is a cross-sectional schematic view illustrating an electronic device according to another embodiment of the disclosure.

FIG. 7 is a cross-sectional schematic view illustrating an electronic device according to another embodiment of the disclosure. Please refer to FIG. 7. In the embodiment, an electronic device 500 includes a cover plate 510, a display module 524, a conductive article 530, a frame 540 and a main body 550. The cover plate 510 includes a plate 512, a conductive layer 518 and a touch layer 519. The plate 512 has two surfaces 514 opposite to each other and a lateral surface 516 connected between the two surfaces 514. The lateral surface 516 of the plate 510 is framed by the conductive layer 518. The touch layer 519 is disposed at one of the surfaces 514 of the plate 510; the touch layer 519 and the cover plate 510 constitute a touch module 522. The touch module 522 is disposed at one side of the display module 524, and the main body 550 is disposed at the other side of the display module 524. The frame 540 encompasses the cover plate 510 and the display module 524. Likewise, in the embodiment, although the element that is used for performing the touch control function is different from that mentioned in the above embodiments, the electronic device 500 also enables the conductive layer 518 which frames the lateral surface 516 of the plate 510 to contact the conductive article 530, and the conductive article 530 contacts the frame 540, enabling the conductive layer 518 to be conducted to the frame 540. Specifically, the cover plate 510 of the embodiment may be a one glass solution (OGS) touch panel or a touch on lens (TOL) touch panel, through which a touch sensor is directly provided in a protection glass so both are integrated into one glass, allowing the overall thickness to be reduced.

Based on the above descriptions, the cover plate of the disclosure enables the frame of the electronic device to be conducted via disposing the conductive layer to frame the lateral surface of the plate. Since it is easy for the electrostatic charges to flow toward the gap between the cover plate and the frame, when the user operates the electronic device, the electrostatic charges from the fingers may flow toward the frame along the conductive layer of the cover plate and then be conducted to the ground end of the main body, thereby preventing the ESD from damaging the electronic device. In addition, the disclosure replaces the circular ground line of the conventional touch panel with the conductive layer framing the lateral surface of the plate and the frame which is conducted to the conductive layer; in that case, the width of the decoration layer of the touch panel will be sufficient as long as it can cover the transmission circuit. Therefore, the slim border design for the electronic device may be realized.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A cover plate for an electronic device, comprising:
a plate, having two surfaces opposite to each other and a lateral surface connected between the two surfaces;
a conductive layer, disposed at the lateral surface of the plate, wherein the conductive layer is electrically connected to a ground end of the electronic device, wherein the electronic device comprises a frame encompassing the cover plate and being electrically connected to the conductive layer, wherein the frame is conductive, the frame is connected to the ground end of the electronic device, when the electronic device is operated, electrostatic charges may flow from the conductive layer of the cover plate toward the ground end via the frame;
a touch module, comprising a plurality of conductive articles located at the center and a plurality of peripheral transmission circuits located externally around the perimeter of the touch module; and
a slim border decoration layer, disposed on one of the surfaces of the plate and covering the peripheral transmission circuit, wherein a width of the slim border decoration layer is only large enough to cover a width of the peripheral transmission circuit and no larger.

2. The cover plate according to claim 1, wherein the conductive layer does not encompass the plate.

3. The cover plate according to claim 1, wherein the electronic device further comprises a conductive article, the conductive layer is electrically connected to the electronic device via the conductive article.

4. The cover plate according to claim 3, wherein the conductive article is formed by a cured conductive adhesive.

5. The cover plate according to claim 3, wherein the conductive article comprises a conductive rubber.

6. The cover plate according to claim 1, wherein the electronic device further comprises a display module, and the cover plate is disposed on the display module.

7. The cover plate according to claim 1, wherein the conductive layer encompasses the plate.

8. The cover plate according to claim 1, wherein the conductive layer comprises a conductive material, and the conductive layer is formed on the lateral surface of the plate by spraying, coating, plating or injection molding.

9. An electronic device, comprising:
   a cover plate comprising a plate, a conductive layer, a touch module and a slim border decoration layer, wherein the plate has two surfaces opposite to each other and a lateral surface connected between the two surfaces, the conductive layer being disposed at the lateral surface of the plate, wherein the conductive layer is electrically connected to a ground end of the electronic device, wherein the touch module comprises a plurality of conductive articles located at the center and a plurality of peripheral transmission circuits located externally around the perimeter of the touch module, the slim border decoration layer is disposed on one of the surfaces of the plate and covers the peripheral transmission circuit, a width of the slim border decoration layer is only large enough to cover a width of the peripheral transmission circuit and no larger;
   a main body, disposed within the electronic device and electrically connected to the conductive layer; and
   a frame encompassing the cover plate and electrically connected to the conductive layer, wherein the frame is conductive, the frame is connected to the ground end of the electronic device, when the electronic device is operated, electrostatic charges may flow from the conductive layer of the cover plate toward the ground end via the frame.

10. The electronic device according to claim 9, wherein the conductive layer does not encompass the plate.

11. The electronic device according to claim 9, wherein a material of the frame is metal.

12. The electronic device according to claim 9, wherein the frame is formed of metal and plastic by injection molding.

13. The electronic device according to claim 9, further comprising a conductive article, wherein the conductive layer is conducted to the main body via the conductive article.

14. The electronic device according to claim 13, wherein the conductive article is formed by a cured conductive adhesive.

15. The electronic device according to claim 13, wherein the conductive article comprises a conductive rubber.

16. The electronic device according to claim 9, further comprising:
   a display module, wherein the cover plate is disposed on the display module.

17. The electronic device according to claim 9, wherein the conductive layer encompasses the plate.

18. The electronic device according to claim 9, wherein the conductive layer comprises a conductive material, and the conductive layer is formed on the lateral surface of the plate by spraying, coating, plating, or injection molding.

* * * * *